Patented Nov. 12, 1940

2,221,377

UNITED STATES PATENT OFFICE 2,221,377

SUBSTITUTED AMMONIUM SALTS OF SULPHOCARBOXYLIC ACID ESTERS

Benjamin R. Harris, Chicago, Ill., assignor to The Emulsol Corporation, Chicago, Ill., a corporation of Illinois No Drawing. Application October 10, 1938, Serial No. 234,251

18 Claims. (Cl. 260—481)

My invention relates to a new class of chemical substances, and more in particular to a new class of chemical substances particularly adapted for use as detergents, wetting, penetrating, emulsifying, lathering, flotation and anti-spattering agents, and for frothing purposes.

My present application is a continuation-in-part of my copending application, Serial No. 174,655, filed November 15, 1937 now Patent No. 2,166,143, which, in turn is a continuation-in-part of my application, Serial No. 627,096, filed July 30, 1932 now Patent No. 2,190,921. This latter application, in turn, is a continuation-in-part of my application Serial No. 481,349, filed September 11, 1930, now Patent No. 1,917,255, which was based on a still earlier application, Serial No. 475,622, filed August 15, 1930, now Patent No. 1,917,250. My present application also contains subject matter taken from my copending applications Serial No. 30,880, filed July 11, 1935, and Serial No. 121,563, filed January 21, 1937.

The subject matter claimed in the instant case is directed specifically to the sulpho-carboxylic and sulpho-fatty acid esters wherein hydrogen of sulphonic acid radicals of the sulpho-carboxylic and sulpho-fatty acid groups is replaced by cations in the form of substituted ammonium, namely, organic nitrogenous bases. Such compounds, while possessing the essential chemical structure and characteristics and properties of my sulpho-carboxylic esters, as claimed in my copending applications, for example, Serial Nos. 627,096; 121,563; and 174,655, are important, among other things, for their excellent water-solubility and detergent characteristics. They are all specific to and fall within the scope of the claims in my aforementioned copending applications.

In certain classes of industries, there is a need for a certain class of chemical substances usually used in relatively small proportions but capable of use in larger proportions to secure an effect principally the result of a wetting action such as at a water-oil interface. In the textile and dyeing industries, for example, there are many situations where a wetting or detergent action is imperative as, for example, in laundering, bleaching, mercerizing, dyeing or other operations, and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen. These problems are considered by some investigators as entirely a matter of wetting; in other words, by promoting greater attraction between the oleaginous and aqueous portions of the emulsion at the interfaces thereof. Although the problem is probably not one of wetting action entirely, it appears that certain compounds which in theory tend to concentrate at the water-oil interface have an effect upon the spattering behavior of margarine. This problem is discussed and a remedy disclosed in my prior Patents Nos. 1,917,250 and 1,917,256.

The substances of my invention are, in general, substituted ammonium, or organic nitrogenous base salts of ester derivatives of lower molecular weight carboxylic acids with at least one unesterified sulphonic acid group in the carboxylic acid radical wherein the group esterified with the carboxylic acid has a lipophile radical with at least four carbon atoms. In certain circumstances there may be more than one unesterified sulphonic acid group in the carboxylic acid radical or there may be sulphonic acid groups that are esterified and other sulphonic acid groups that are not esterified, but in all cases there must be at least one unesterified sulphonic acid group in the carboxylic acid radical. The carboxylic acid radical with the free sulphonic acid group is of relatively low molecular weight and should contain not more than eight carbons.

Considering the compounds from another aspect, the molecule in each instance contains a lipophile group having at least four carbon atoms and a relatively low molecular weight hydrophile group which, in the class of compounds to which my present invention relates, are sulpho-carboxylic or sulpho-fatty acid radicals, the hydrogen of the sulphonic group or groups of which is replaced by a substituted ammonium cation. From still another angle, the compounds may be considered as combinations of a lipophile group having at least four carbon atoms and a relatively low molecular weight sulpho-carboxylic or sulpho-fatty acid group having a substituted ammonium cation. A more complete understanding of what may comprise the lipophile group and the particular character of the sulpho-carboxylic or sulpho-fatty acid group will be had as the detailed description progresses.

The function of the sulphonic acid group is to impart hydrophillic properties, that is, water wetting or water attracting properties, to the molecule as a whole. The groups which are esterified by the sulpho-carboxylic or sulpho-fatty acid are in general of a lipophile character. At times they may be strongly lipophillic and at other times moderately lipophillic. They may be of low molecular weight or of moderately high molecular weight, depending upon the purpose for which the substances may be used.

The lipophile groups entering into the molecular structure of my substances may be of simple character as, for example, in sulpho-acetates of straight chain alcohols such as hexyl alcohol, octyl alcohol, decyl alcohol, lauryl alcohol and the like, or in similar lower molecular weight sulpho-carboxylic acid esters of branched chain alcohols such as 2-ethyl hexanol-1, 2-butyl-octanol-1, and the like.

Others of the substances of my invention are lower molecular weight sulpho-carboxylic acid esters of polyhydroxy substances at least one hydroxy group of the polyhydroxy substance being esterified with a carboxylic acid containing at least four carbon atoms and preferably between eight and eighteen carbon atoms. In addition to the compounds mentioned above, other examples of compounds falling within the scope of my invention are as follows:

(1) Cetyl ether of mono-stearin sulphoacetate (Triethanolamine salt)

(2) Monolaurin sulpho-acetate (pyridine salt)

(3) Monopalmitin sulpho-butyrate (monoethanolamine salt)

(4) Mono-palmitic acid ester of ethyleneglycol sulpho-propionate (diethanolamine salt)

(5) Di-sulphoacetic acid ester of mono-olein (di-pyridine salt)

(6) Mono-palmitic acid ester of tri-methylene glycol sulphoacetate (quinoline salt)

(7) α-stearic, β-benzoic, α'-sulphoacetic acid ester of glycerin (amylamine salt)

(8) α-stearic, β-(p-sulphethoxy) benzoic, α'-sulphopropionic acid ester of glycerin (tripropanolamine salt)

(9)

(10) Monostearic acid ester of diethylene glycol sulpho-acetate (methyl-pyridine salt)

(11) Mono-oleic acid ester of diethylene glycol sulphoacetate (pyridine salt)

(12) Monostearin sulphoacetate (diethanolamine salt)

(13) Octyl sulphoacetate (monoethanolamine salt)

(14) Butyl diethylene glycol sulphoacetate (octylamine salt)

(15) Oleyl sulphoacetate (hexylamine salt)

(16) Ricinoleyl sulphoacetate (propylamine salt)

(17) Lauryl sulphoacetate (monoethanolamine salt)

(18) Sulphoacetate of 2-ethyl hexanol-1 (pyridine salt)

(19) Stearyl sulphoacetate (quinoline salt)

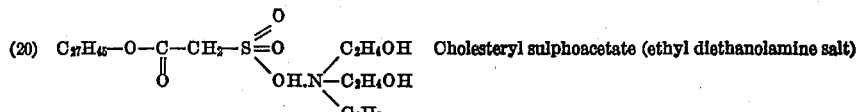
(20) Cholesteryl sulphoacetate (ethyl diethanolamine salt)

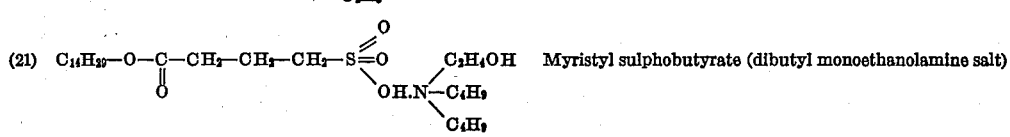
(21) Myristyl sulphobutyrate (dibutyl monoethanolamine salt)

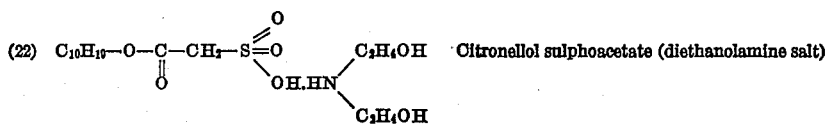
(22) Citronellol sulphoacetate (diethanolamine salt)

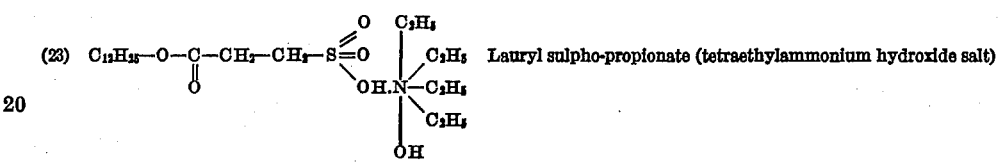
(23) Lauryl sulpho-propionate (tetraethylammonium hydroxide salt)

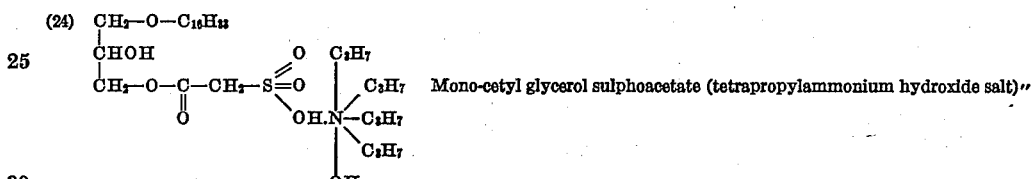
(24) Mono-cetyl glycerol sulphoacetate (tetrapropylammonium hydroxide salt)

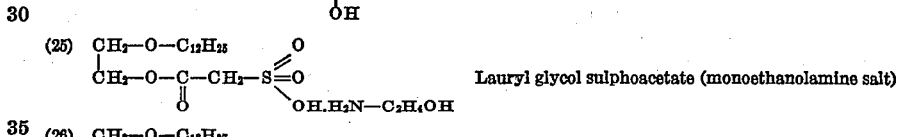
(25) Lauryl glycol sulphoacetate (monoethanolamine salt)

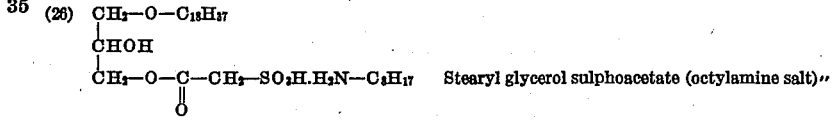
(26) Stearyl glycerol sulphoacetate (octylamine salt)

I may select many different types of compounds as lipophile groups, particularly those having at least eight carbon atoms although, for some purposes the lipophile group or groups may contain as low as four carbon atoms. For example, the following compounds may be utilized as sources of lipophile groups, and sulpho-carboxylic acid esters thereof such as sulphoacetates may be prepared therefrom by procedures described more fully hereinafter: butyl alcohol, amyl alcohol, hexyl alcohol, octyl alcohol, nonyl alcohol, decyl alcohol, lauryl alcohol, myristyl alcohol, cetyl alcohol, oleyl alcohol, stearyl alcohol, ricinoleyl alcohol, palmitoleyl alcohol, ricinoleic acid, hydroxy and α-hydroxy fatty acids such as α-hydroxy stearic acid, α-hydroxy lauric acid, ι-hydroxystearic acid, α-hydroxy palmitic acid, and the like, ceryl alcohol, carnaubyl alcohol, myricyl alcohol, and, in general, the higher molecular weight saturated and unsaturated aliphatic alcohols. I may also employ cyclo-aliphatic or ali-cyclic alcohols such as the sterols, as, for example, cholesterol, iso-cholesterol, phytosterol, as well as hydro-aromatic alcohols such as abietol. In addition, I may utilize such unsaturated alcohols as linalool, citronellol, geraniol and the like. It is, of course, obvious that the alcohols may be prepared in accordance with any desired method. For example, these alcohols may be prepared by the so-called Bouveault and Blanc method or, alternatively, by the reduction or catalytic reduction with hydrogen of natural or hydrogenated animal or vegetable fats and oils in accordance with well known practices. Again, the alcohols may be derived from synthetic processes such as by the oxidation of hydrocarbons or may be prepared by saponification of waxes and the like. Alternatively, they may be prepared by reduction of aldehydes or by the Grignard reaction. Still other methods known in the literature may likewise be employed if desired or deemed expedient. It is likewise apparent that mixtures of the foregoing or other alcohols may be utilized as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$. The sulpho-carboxylic esters of these mixtures of alcohols function in substantially the identical manner as the sulpho-carboxylic acid esters of the substantially pure alcohols. Again, mixtures of alcohols such as are present in the so-called sperm oil alcohols, as well as those present in wool-fat, may equally efficaciously be utilized. Indeed, these higher molecular weight alcohols are generally, if, indeed, not almost invariably, offered on the market in the form of mixtures of different alcohols. If desired for any specific purpose, special fractions which predominate in a certain particular higher molecular weight alcohol may be utilized or, if so desired, the sulpho-carboxylic esters may be prepared from a single, substantially pure alcohol. Since, obviously, for example, lauryl alcohol is the same irrespective of how it is prepared, the sulphoacetates or the like prepared therefrom are the same and function in like manner. Similarly, sulphoacetates of commercial mixtures of alcohols containing predominant amounts of, for example, lauryl alcohol, function essentially identically the same as the sulphoacetates of pure lauryl alcohol. It will be seen, therefore, that the source of the higher molecular alcohols from which my sulpho-carboxylic esters are prepared is entirely immaterial.

So far as the sulpho-carboxylic esters are concerned which are derivatives of polyhydroxy substances, I may select many different types of compounds as lipophile groups which are to be esterified with the polyhydroxy substances, principally compounds having lipophile radicals of relatively high molecular weight. For example, the following materials may be utilized as sources of lipophile groups: carboxylic or fatty acids such as butyric acid, caprylic acid, caproic acid, capric acid, saturated and unsaturated higher molecular weight aliphatic acids such as the higher fatty acids containing at least eight carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, montan wax, and carnauba wax and carboxylic acids derived, by oxidation and other methods, from petroleum, hydroaromatic acids such as naphthenic acid, abietic acid, hydroxy aromatic acids such as hydroxy benzoic acid, aromatic acids such as benzoic acid, naphthoic acid, and the like.

The polyhydroxy substances which provide the linkage between the lipophile group and the sulpho-carboxylic group may be selected from a large class and include glycerol; glycols such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol and dulcitol; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as for example:

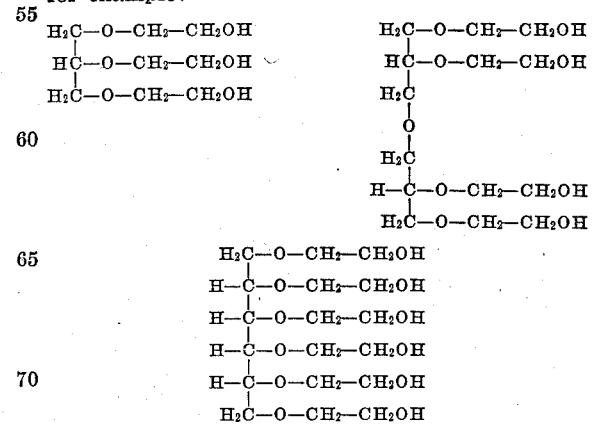

(For convenience, all hydroxyl groups are written facing one way).

In those of my compounds which are sulpho-carboxylic esters of lipophile derivatives of polyhydroxy substances, the linkage between the polyhydroxy substance and the lipophile group need not be an ester linkage, although such is preferred, but it may be an ether linkage, as illustrated by compounds numbered 14, 24, 25 and 26 hereinabove.

From a study of the compounds which I list hereinabove, those skilled in the art will understand that I may use many different expedients for forming the compounds in so far as the dominant lipophile group and the relatively low molecular weight sulpho-fatty acid group are concerned. As stated, however, ester linkages are utilized between these two portions of the compound, and the skilled chemist will understand in general the most approved practices in securing this result. Numerous methods are also available for the introduction of the sulphonic acid group. In the case of aromatic sulphonic acids, of course, standard sulphonation procedures employed for producing aromatic sulphonic acids may be used, and, if desired, the lipophile group may be introduced subsequently.

In the case of aliphatic sulphonic acids, and, for that matter, even for the production of aromatic sulphonic acids, a reactive halogen may be caused to react with sodium sulphite or potassium sulphite or ammonium sulphite or some other sulphite such as triethanolamine sulphite in aqueous solution, if desired. If the alkali metal or other salts are initially prepared, they may be converted into the substituted ammonium derivatives in any suitable manner as disclosed, for example, in my copending application, Serial No. 190,136, filed February 11, 1938.

Another method is to introduce a sulph-hydryl or disulphide or some other suitable sulphur group and then oxidize to the sulphonic acid with nitric acid or a permanganate or some other oxidizing agent.

Still other methods will suggest themselves to the skilled chemist. Thus, for example, one or more esterifiable hydroxyl groups of a higher molecular weight alcohol or of a polyhydroxy derivative may be caused to react, under suitable conditions, with sulpho-acyl halides such as are represented by the formula:

wherein X is halogen, particularly chlorine or bromine, and $n$ is a small whole number, at least one. The sulpho-acyl halides may also be of the type wherein the sulphonic group is attached to an intermediate carbon instead of to the terminal carbon as illustrated above.

Another method which may also be employed to produce the compounds of my invention involves reacting a straight chain higher molecular weight alcohol or a polyhydroxy compound or derivative thereof, there being at least one free hydroxy group present in the polyhydroxy nucleus, with a sulpho-acyl anhydride the sulphonic group of which may be attached to either the terminal or an intermediate carbon atom of the sulpho-acyl anhydride. In this as well as in such other instances where the sulphonic acid group is present in unneutralized form, I neutralize the same with a substituted ammonium cation.

My preferred process comprises reacting a higher molecular weight alcohol, such as cetyl alcohol, or one or more free or esterifiable hydroxy groups of a polyhydroxy substance, or derivative of a polyhydroxy substance, with a halogeno-carboxylic acid such as chloracetic or bromacetic acid, or with a halogeno-carboxylic acid halide such as chlor-acetyl chloride or bromacetyl bromide, to form a chloracetate or bromacetate, and then converting the latter into the sulphonic acid derivative by reaction with an alkali sulphite.

The following examples are illustrative of the preparation of compounds falling within the scope of my invention. It will be understood that said examples are given only by way of illustration and are not to be considered in any way limitative of the true scope of my invention. In each instance, I preliminarily form an alkali salt of a sulpho-carboxylic acid ester in order primarily to obtain a particularly good yield. I then convert the alkali salt into a substituted ammonium, namely, organic nitrogenous base salt in any desired manner. This may be accomplished, for example, by reacting an aqueous solution, preferably at elevated temperatures of the order of 80 degrees C., of the alkali salt of the sulpho-carboxylic acid ester with barium chloride to precipitate the barium salt of the sulpho-carboxylic acid ester. The latter salt may then be treated with sulphuric acid to produce the free sulpho-carboxylic acid derivative and the barium sulphate produced in the reaction may be filtered out or otherwise removed if desired. The free sulpho-carboxylic acid derivative may then be neutralized with any desired substituted ammonium derivative such as those previously listed.

A more readily practiced method, as indicated hereinabove, is to utilize the process disclosed in my copending application, Serial No. 190,136, filed February 11, 1938. In accordance with this process, the alkali salts, for example, of the sulpho-carboxylic acid esters, in the form of a solution thereof, are passed through a bed of base exchange material which has been previously treated with a solution of a substituted ammonium base whereby the alkali cation is replaced by the substituted ammonium cation. As illustrative of such procedure, the monoethanolamine salt of lauryl sulpho-acetate may be prepared as follows: A 22½% monoethanolamine sulphate aqueous solution (400 cc.) is first utilized to impart monoethanolamine cations to a suitable base exchange material such as that which is known as "Crystallite", the solution being allowed to pass over the base exchange material for about 20 minutes or until tests show that an adequate introduction of monoethanolamine ions has been effected. This conditioning solution is then withdrawn and the "Crystallite" is washed carefully with about 400 cc. of cold water and again with about 400 cc. of tap water at a temperature of approximately 65 degrees C. After substantially all of the water is drained off, 300 cc. of a hot aqueous solution (65 degrees C.) containing approximately 15% of lauryl potassium sulpho-acetate is then passed through the bed of base exchange material and a limpid clear solution containing 15.7% of solids is obtained. The potassium salt of lauryl sulpho-acetate is thereby converted almost entirely into the monoethanolamine salt of lauryl sulpho-acetate. If desired, the monoethanolamine salt of lauryl sulpho-acetate may be recovered from the solution by evaporation or by any other suitable method.

In accordance with the same general method, potassium salt monostearine sulpho-acetate may be converted into the triethanolamine salt of monostearine sulpho-acetate by passing a 15% solution of potassium salt of monostearine sulpho-acetate, at 70 degrees C., through a base exchange material containing triethanolamine cations, previously prepared by passing an aqueous solution containing about 20% of triethanolamine sulphate through the base exchange material.

The exact manner in which the substituted ammonium, namely, the organic nitrogenous base salt of the sulpho-carboxylic esters is prepared forms no part of my present invention. Various other methods will suggest themselves to those skilled in the art, particularly in the light of my disclosure. Thus, for example, in addition to that which is described hereinabove, an ammonium salt of a sulpho-carboxylic acid ester may be suspended in a non-aqueous medium and ethylene oxide pumped thereinto. Again, an ammonium salt of sulpho-carboxylic ester in the dry state may be heated with triethanolamine or the like until ammonia is evolved and the triethanolamine replaces the ammonia as the cation.

Illustrative examples of preparing the alkali salts of the sulpho-carboxylic esters which may, if desired, be utilized in the preparation of the substituted ammonium or organic nitrogenous base salts are as follows:

*Example I—Monostearine Sulphoacetate, Na salt*

(a) 700 parts of monostearine were heated with 175 parts of chloracetic acid for 3 hours at a temperature of 150–160 degrees C. in an atmosphere of $CO_2$ and with agitation. The reaction product was washed free of chloracetic acid with 4 times its own volume of water at 95 degrees C. and, to assist in separation, 100 parts of salt were added to the wash water.

(b) The product obtained in (a) was mixed with 500 parts of water, heated to about 60 degrees C., and then 175 parts of sodium sulphite were added. The temperature was maintained at 60–75 degrees C. with constant stirring for the first hour, then raised to 90–95 degrees C. and kept at that temperature for about three-quarters of an hour.

(c) To remove excess sulphite and other objectionable impurities, the product obtained in (b) was dispersed in 8 times its own volume of water at 80 degrees C., salted out with about 10% salt, allowed to settle and the wash water drained off.

The process of dispersion, salting out and draining was repeated twice. On stirring and cooling, a white paste containing about 50% water was obtained. The water may be eliminated in any desired manner to produce a dry product.

*Example II—Monostearic acid ester of diethylene glycol sulphoacetate, K salt*

(a) 500 parts of diethylene glycol monostearate, prepared by heating a mixture of one part of stearic acid with one part of diethylene glycol at a temperature of about 220 degrees C., using 0.1% KOH until the free fatty acid content is down to about ½ to 1%, was heated with 250 parts of chloroacetic acid at 160–170 degrees C. for 4 hours. The product was washed free of chloroacetic acid and dried.

(b) 50 parts of the product obtained in (a) were mixed with 35 parts of potassium sulphite and 50 parts water. 2 parts of potassium iodide were added and the mixture stirred and heated for about 10 hours at 70–75 degrees C. At the end of the 10 hours, 800 parts of hot isopropyl alcohol were added, the mixture brought to the boiling point and filtered hot. The alcohol solution was allowed to cool. The product was obtained in the form of a precipitate consisting of crystals of grayish leaflets. These dissolved readily in hot water.

*Example III—Cholesteryl sulphoacetate, Na salt*

(a) 9 parts by weight of cholesterol, 9 parts by weight of brom acetyl bromide, and 40 parts by weight of benzene were heated under a reflux condenser for two hours at the boiling point of the mixture. The reaction mixture was then washed repeatedly with hot water until it was substantially free of acid and freed of benzene by distilling from a steam bath.

(b) 7 parts by weight of the above reaction product were then treated with 7 parts by weight of sodium sulphite, the latter being previously dissolved in 40 parts of hot water, the mass being heated for five hours at about 100 degrees C. with continuous, vigorous agitation.

(c) The above reaction mixture was then washed several times with hot brine, until free of sulphites, dried, and finally purified by extracting the impurities with dry ethyl ether. An analysis showed that the final product was cholesteryl sulphoacetate, sodium salt, containing a small percentage of sodium chloride.

*Example IV—Mono-Dodecyl glycerol sulphoacetate, Na Salt*

(a) 5.2 grams of 96% sodium hydroxide, dissolved in 10 cc. of water, were mixed with 95 grams of glycerol. The mixture was heated to a temperature of 190 degrees C. while stirring and kept at that temperature for 10 minutes to drive off water. The temperature was then lowered to 170 degrees C. While stirring, 23 grams of n-1-dodecyl chloride were added to a reflux condenser. Heating was continued under reflux, with stirring, for a period of 20 to 25 minutes, whereby the temperature of the reaction mixture gradually rose to 190 degrees C. During this period the dodecyl chloride gradually disappeared as was indicated by the diminishing amount of refluxed material. The stirring was continued for thirty more minutes at a temperature of 190 degrees C. to 200 degrees C. The resulting product comprised essentially the mono-dodecyl ether of glycerol.

(b) About 250 grams of the resulting ether, washed free of sodium chloride if desired, were then mixed with 130 grams of chloracetyl chloride, the latter being added dropwise at about 38 degrees C. to 40 degrees C.

(c) The resulting product washed free of hydrochloric acid, was then mixed with 1000 grams of sodium sulphite dissolved in 5000 cc. of water and heated to between 75 degrees C. and 85 degrees C. for one and one-half hours with constant stirring.

The resulting product, mono-dodecyl glycerol sulphoacetate, Na salt

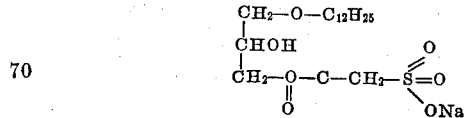

was recovered in purified form in substantially the same manner as described in the above examples.

*Example V—Lauryl sulphoacetate, K and Na salts*

(a) 500 grams of lauryl alcohol and 275 grams of chloracetic acid were heated together for two hours at 140 degrees C. to 150 degrees C. in an atmosphere of carbon dioxide gas. The reaction product was then washed free of excess chloracetic acid and, if desired, may be dried over anhydrous sodium sulphate.

(b) 520 grams of the lauryl chloracetate produced as described in part (a) were mixed with 410 grams of anhydrous potassium sulphite dissolved in 550 cc. of water and the entire mass was stirred vigorously and heated for four hours at 95 degrees C. to 97 degrees C. If desired, the reaction may be facilitated by the addition to the reaction mass of 5 grams of potassium iodide or 2 to 3 grams of lauryl potassium sulphoacetate or a mixture of both the iodide and the sulphoacetate. When the reaction was completed, the resulting mass was poured into 2500 cc. of cold water, with stirring, and the mixture was then cooled to 20 degrees C., whereupon the crude lauryl potassium sulphoacetate was filtered off.

(c) If it is desired to further purify the product, it may be dissolved in hot water (80 degrees C. to 90 degrees C.) to make approximately a 10% solution and the solution may then be cooled to 20 degrees C., at which temperature practically all of the lauryl potassium sulphoacetate crystallizes out. The crystals may then be filtered off and dried. They are of white, fluffy character.

(d) To prepare lauryl sodium sulphoacetate, the reaction was carried out in the same way as described in (b) except that the following proportions of ingredients were employed:

500 grams lauryl chloracetate
365 grams sodium sulphite
500 cc. water (e) Because of the greater solubility of the sodium salt of lauryl sulphoacetate than that of the potassium salt, it is somewhat more difficult to isolate the former. In the present case, the reaction mass of part (d) was mixed with between 5 and 6 volumes of hot water (80 degrees C. to 90 degrees C.) and was heated and stirred until essentially completely dispersed. About 15% of common salt was then added and the entire mass was then chilled and filtered. The dispersion in hot water and the salting-out operation were repeated four times. The paste which was obtained was then dried. It could be still further purified by admixture with 10 volumes of hot isopropyl alcohol, filtering, and cooling the alcohol solution to cause the lauryl sodium sulphoacetate to crystallize out.

Many of the compounds of my invention may be represented by the general formula

wherein R denotes a lower molecular weight aliphatic radical containing at least one sulphonic acid radical whose hydrogen is replaced by a substituted ammonium cation and $R_1$ denotes a radical of a higher molecular weight mono- or polyhydric alcohol.

Many of the compounds of my invention may also be represented by the general formula

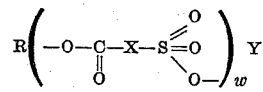

wherein R is a radical comprising or containing a lipophile group with at least four carbon atoms and preferably from twelve to eighteen carbon atoms, X is the carbon-hydrogen residue of the sulpho-carboxylic acid, Y is a substituted ammonium cation, and w is a small whole number, at least one.

Still others of the compounds of my invention may be represented by the following general formula

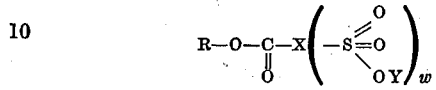

wherein R is the residue of a polyhydroxy substance in which the hydrogen of at least one hydroxyl group is substituted by an alkyl or acyl group containing at least four carbon atoms and preferably between eight and eighteen carbon atoms, X is the carbon-hydrogen residue of the sulpho-carboxylic acid, Y is a substituted ammonium cation, and w is a small whole number, at least one.

I have previously referred to the fact that the lipophile group may in itself contain hydrophile radicals. For example, in the case of monostearin sulphoacetate, the hydroxy radical of the second glycerine carbon has a recognized hydrophillic character. The group as a whole, however, of which this hydroxy radical is a part, is dominantly lipophile, the single hydroxy radical in such a compound being insufficient to impart dominant hydrophile characteristics to the group as a whole. Moreover, in the case of a compound having an esterified sulphonic acid group, this sulphonic acid group will usually be found to possess a lipophile character or at least will not have a marked hydrophile character due to the additional group or radical which has been attached to the sulphonic acid group by esterification. When the character "R" is used in the formula, therefore, to represent a lipophile group, it is with the assumption that the group as a whole does not possess a hydrophillic character.

In so far as the sulpho-carboxylic or sulpho-fatty acid group of my compounds is concerned, I may employ a sulpho-acetate, sulpho-propionate, sulpho-butyrate, or other similar groups containing an unesterified sulphonic acid radical and, generally, not more than seven carbon atoms. In general, however, I have found that the sulphoacetates particularly produce compounds of exceptionally valuable characteristics and they have the advantage of being relatively inexpensively produced from commercially available substances.

The terms "sulpho-carboxylic acid" and "sulpho fatty acid" as employed throughout the specification and claims are used in a strictly rigorous sense to mean a compound which contains at least one

group. The numerous examples given are clear in this feature.

In the event that the compounds of my invention are made by reacting the halogen derivatives with alkali sulphites or other soluble sulphites as well as thio-sulphates, the corresponding alkali sulphonic acid derivative will be produced. These may be converted into the substituted ammonium derivatives in various ways as previously pointed out. When prepared by other methods so that the compounds contain the sulphonic acid group (—SO₃H), the hydrogen thereof may be replaced by substituted ammonium cations such as primary, secondary and tertiary amines including alcohol-, alkylol-, and aralkylol- amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl monoethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl monoethanolamine, 1-amino-2, 3-propanediol, 1,2-diamino-propanol; alkylamines such as ethylamine, propylamine, laurylamine, cetylamine, butylamine, hexylamine, cyclohexylamine, aniline, toluidines, dimethylamine, diethylamine, N-methyl-N-ethyl amine, triethylamine, trimethylamine, ethylene diamine, diethylene triamine, triethylene tetra-amine, betaine, monomethyl ethylene diamine, monoethyl diethylene tetra-amine, mono-allyl amine, hydrazine and substituted hydrazine, aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrrolidines, nicotine, and homologues and derivatives or substitution products thereof, and, in general, primary, secondary and tertiary amines substituted or not with other radicals, such as hydroxy, alkyl, aryl, cyclo-alkyl groups and the like; quaternary ammonium bases or hydroxides such as tetra-methyl ammonium hydroxide, tetra-ethyl ammonium hydroxide, quaternary ammonium bases with dissimilar alkyl radicals such as methyl-triethyl ammonium hydroxide, propyl trimethyl ammonium hydroxide; mixtures of any two or more of said bases as, for example, in the case of commercial triethanolamine which contains minor proportions of mono- and di-ethanolamine. It will be understood that these substituted ammonium compounds, namely, organic nitrogenous bases may be utilized in pure, impure, or commercial form.

It will be understood that the selection of the particular halogen derivatives which are utilized in the preparation of the halogen-carboxylic acid ester intermediate products will depend upon certain factors. Thus, while bromo- and iodo-derivatives, in general, react slightly more rapidly than do the chloro- derivatives, the relatively cheaper cost of the latter will generally justify their use from a purely economic standpoint.

The term "residue", as used throughout the specification and claims, is employed in its ordinarily understood chemical significance. For example, where one of the hydroxyl groups of glycerine is esterified with a fatty acid and another of the hydroxyl groups of the glycerine is esterified with a sulpho-carboxylic acid, that which remains of the glycerine molecule, for example

is the "residue" of the polyhydroxy substance, in this case glycerine.

Similarly, the term "carbon-hydrogen residue" of a sulpho-carboxylic acid is employed as in conventional chemical nomenclature. Thus, for example, if sulpho-acetic acid (HOOC—CH₂—SO₃H)

is esterified with glycerine, the group —CH₂— is to be considered as the "carbon-hydrogen residue" of the sulpho-acetic acid.

It will be understood that the term "lipophile group", as employed herein, is intended to cover any radical containing at least four carbon atoms and having an affinity for oleaginous material such as oils, fats, hydrocarbons and the like and may comprise radicals such as hydrocarbon radicals, acyl or alkyl groups derived from aliphatic or fatty acids or their corresponding alcohols, and the like. The hydrophile group or groups, in other words, the groups having an affinity for aqueous materials are, as fully set forth hereinabove, sulpho-carboxylic or sulpho-fatty acid groups.

Unless otherwise indicated, the term "higher", wherever employed in the claims, will be understood to mean at least eight carbon atoms and, concomitantly, the term "lower" will mean less than eight carbon atoms.

What I claim as new and desire to protect by Letters Patent of the United States is:

1. Lower molecular weight sulpho-mono-carboxylic acid esters of alcohols containing at least eight carbon atoms, hydrogen of the sulphonic groups of the sulpho-mono-carboxylic acid radical being replaced by substituted ammonium radicals.

2. Lower molecular weight sulpho-fatty acid esters of aliphatic alcohols containing from 8 to 18 carbon atoms, hydrogen of the sulphonic groups of the sulpho-fatty acid radical being replaced by substituted ammonium radicals.

3. Chemical compounds in accordance with claim 2 wherein the substituted ammonium radicals are hydroxyalkyl amine radicals.

4. Sulpho-acetic acid esters of aliphatic alcohols containing at least 8 carbon atoms, the hydrogen of the sulphonic group of the sulpho-acetic acid radical being replaced by a substantial ammonium radical.

5. Sulpho-acetic acid esters in accordance with claim 4 wherein the substituted ammonium radicals are ethanolamine radicals.

6. A lower molecular weight sulpho-carboxylic acid ester represented by the general formula

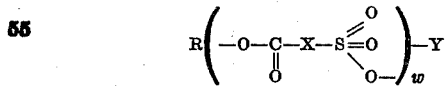

wherein R contains a lipophile group with at least 4 carbon atoms, X is the carbon-hydrogen residue of the lower molecular weight sulpho-carboxylic acid, Y is a substituted ammonium cation, and $w$ is a small whole number, at least one.

7. Sulpho-mono-carboxylic esters corresponding to the general formula

R—COO—R₁ in which R denotes an aliphatic radical, containing up to 7 carbon atoms and at least one sulphonic radical, hydrogen of the sulphonic radical being replaced by a substituted ammonium cation, and R₁ denotes a radical of an alcohol containing at least 8 carbon atoms.

8. Esters of alcohols having at least 8 carbon atoms and sulpho-fatty acids having less than 8 carbon atoms, the hydrogen of the sulphonic group of which is replaced by the radical

wherein at least one of the X's represents $C_nH_{2n}OH$ and the other X's represent members selected from the group consisting of hydrogen, alkyl and $C_nH_{2n}OH$, and wherein $n$ represents a small whole member.

9. Esters of alcohols having at least 8 carbon atoms and sulpho-fatty acids having less than 8 carbon atoms, the hydrogen of the sulphonic group of which is replaced by the radical of a quaternary ammonium base having at least one alkyl group directly connected to the nitrogen of the quaternary ammonium base radical.

10. Sulpho-mono-carboxylic acid esters of lauryl alcohol in which the hydrogen of the sulphonic group of the sulpho-mono-carboxylic radical is replaced by a substituted ammonium cation, the sulpho-mono-carboxylic acid radical of said esters containing less than 8 carbon atoms.

11. Sulpho-fatty acid esters of lauryl alcohol in which the hydrogen of the sulphonic group of the sulpho-fatty radical is replaced by an alkylolamine, the sulpho-fatty acid radical of said esters containing less than eight carbon atoms.

12. An alkylolamine salt of the sulpho-acetic acid ester of lauryl alcohol.

13. Sulpho-fatty acid esters of lauryl alcohol in which the hydrogen of the sulphonic group of the sulpho-fatty acid radical is replaced by mono-ethanolamine, the sulpho-fatty acid radical of said esters containing less than 8 carbon atoms.

14. A monoethanolamine salt of the sulpho-acetic acid ester of lauryl alcohol.

15. A lower molecular weight sulpho-mono-carboxylic acid ester of an alcohol containing at least 8 carbon atoms, a sulphonic group of said sulpho-mono-carboxylic acid radical being connected to the same carbon atom to which the carboxyl group of said sulpho-mono-carboxylic acid radical is connected, hydrogen of the sulphonic groups of said sulpho-mono-carboxylic acid radical being replaced by a substituted ammonium cation.

16. A lower molecular weight sulpho-fatty acid ester of an aliphatic alcohol containing from 8 to 18 carbon atoms, a sulphonic group of said sulpho-fatty acid radical being connected to the same carbon atom to which a carboxyl group of said sulpho-fatty acid radical is connected, hydrogen of the sulphonic acid groups of said sulpho-fatty acid radicals being replaced by a substituted ammonium cation.

17. A lower molecular weight sulpho-mono-carboxylic acid ester of an octyl alcohol, hydrogen of the sulphonic groups of the sulpho-mono-carboxylic acid radical being replaced by substituted ammonium cations.

18. An octyl alcohol ester of a sulpho-mono-carboxylic acid having from 2 to 4 carbon atoms, hydrogen of the sulphonic groups of the sulpho-mono-carboxylic acid being replaced by substituted ammonium cations.

BENJAMIN R. HARRIS.